United States Patent
Brown

(10) Patent No.: US 7,448,004 B1
(45) Date of Patent: Nov. 4, 2008

(54) METHOD AND MANAGEMENT TOOL FOR ASSESSING AN ELECTRONIC DESIGN VALIDATION PROCESS

(76) Inventor: Albert Brown, 142 W. 82nd St., Apt 5, New York, NY (US) 10024

( * ) Notice: Subject to any disclaimer, the term of this patent is extended or adjusted under 35 U.S.C. 154(b) by 0 days.

(21) Appl. No.: 11/220,447

(22) Filed: Sep. 7, 2005

Related U.S. Application Data

(60) Provisional application No. 60/608,300, filed on Sep. 7, 2004.

(51) Int. Cl.
  G06F 9/45 (2006.01)
  G06F 17/50 (2006.01)
(52) U.S. Cl. .............................. 716/5; 716/4
(58) Field of Classification Search ................ 716/4–5
  See application file for complete search history.

(56) References Cited

U.S. PATENT DOCUMENTS 6,651,228 B1 * 11/2003 Narain et al. ................. 716/5
2005/0149311 A1 * 7/2005 McGaughy ................. 703/14
2005/0278576 A1 * 12/2005 Hekmatpour ............... 714/37

* cited by examiner

*Primary Examiner*—Jack Chiang
*Assistant Examiner*—Suresh Memula
(74) *Attorney, Agent, or Firm*—Bernard S. Hoffman

(57) ABSTRACT

A method, management tool, or spreadsheet device that allows a user to analyze, compare, and assess various aspects of an electronic design validation process for an integrated circuit. The exemplary method provides a six-sigma measurement of the effectiveness of an electronic design validation process. Furthermore, various different types of electronic design validation processes can be compared and contrasted for their effectiveness for validating the electronic design throughout the design process.

1 Claim, 6 Drawing Sheets

Pentium® 4 MPROV Model

| | | | A Debug Cycle-Time (Months) | B Bug Exposure (Bugs) | C Design Size (KLOC) | D = Validation Throughput (KLOC / Month) $C \div A$ | E = Debug Rate (Bugs / Month) $B \div A$ | F = Bug Density (Bugs / KLOC) | G Relative Debug Effectiveness/ Efficiency (%) $(B \div C) \times 100$ | H Design Quality/ Sigma (Defects / MLOC) |
|---|---|---|---|---|---|---|---|---|---|---|
| | | | | | | | | | | |
| | DR | | | 1554 | 1000 | | | 1.6 | 20 / ? | |
| MPROV MODEL PHASES | DIV | Block | | 100* | | | | | | |
| | | Subsystem | 9 | 3411 | 1000 | | 379 | 3.4 | | |
| | | System | 12 | 2398 | 1000 | | 200 | 2.4 | | |
| | | Total | 21 | 5909 | | | 281 | 5.9 | 78 / 70 | |
| | IV | | 18 | 392 | 1000 | | 21.8 | 0.4 | | |
| | HIT | Block | | | | | | | | |
| | | Subsystem | | | | | | | | |
| | | System | 9 | 134 | 1000 | | 14.9 | | 2 / 30 | 134 / 5.17 |
| | | Total | | | | | | | | |
| TOTAL | | | 48 | 7989 | 1000 | 21 | 166 | 7.9 | 100 / 100 | |

*Exact level of model-checking is unknown.

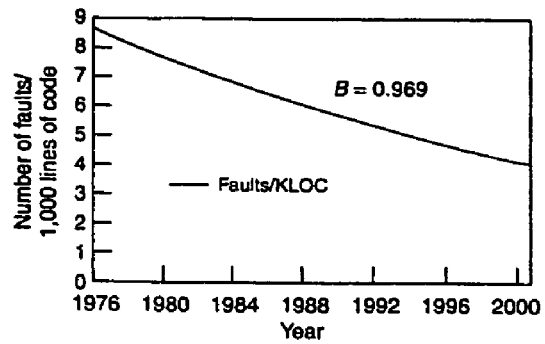
Figure 1. Bug-Density Drop at NASA Goddard (1996)
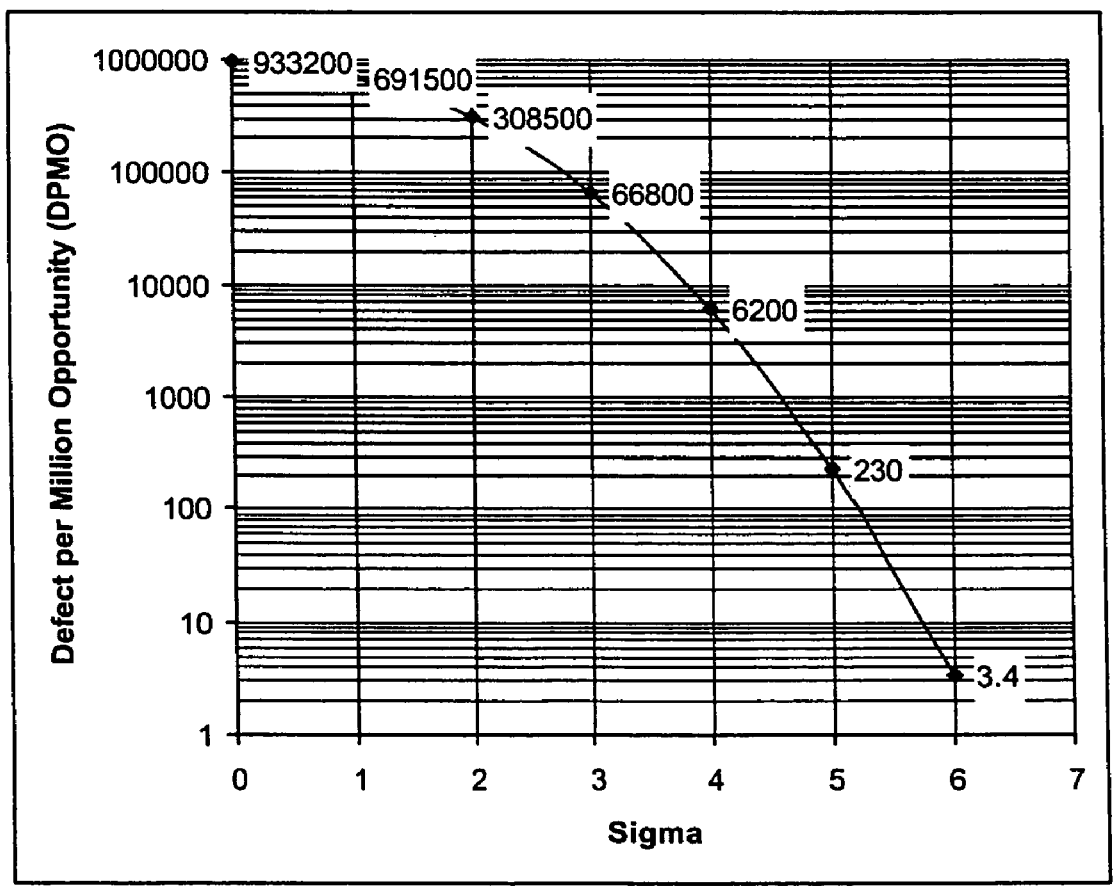
Figure 2. Sigma Capability: Opportunity = LOC or Gates

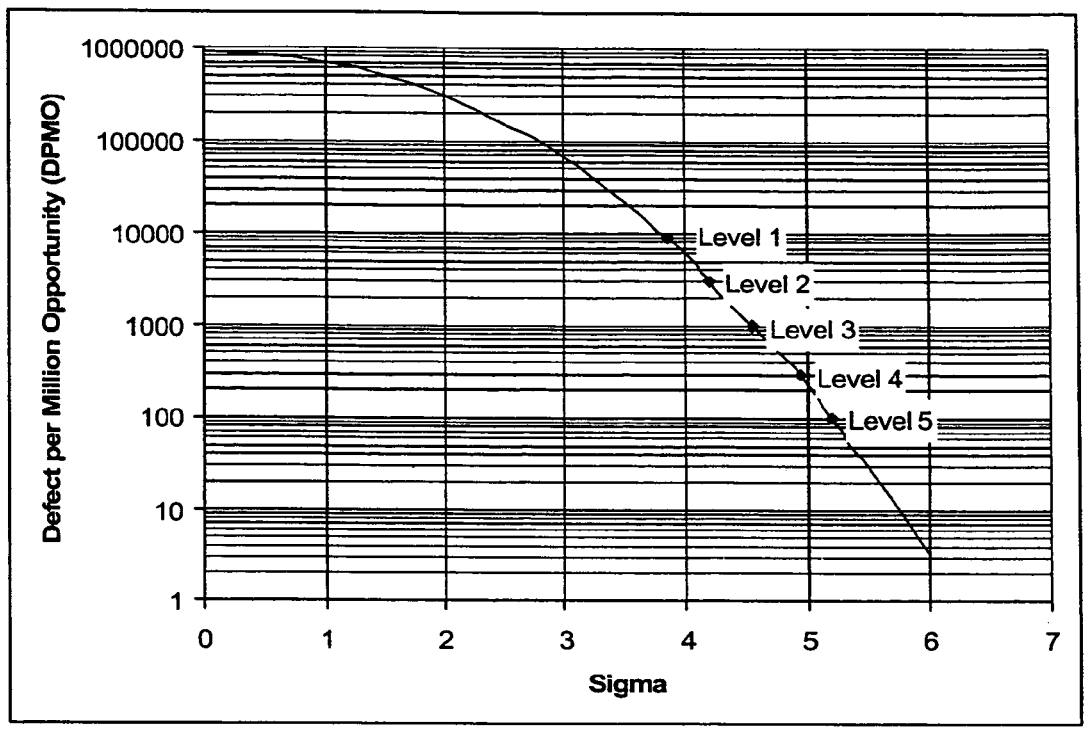
Figure 3 Lockheed Software Development Process Experience with SEI Levels
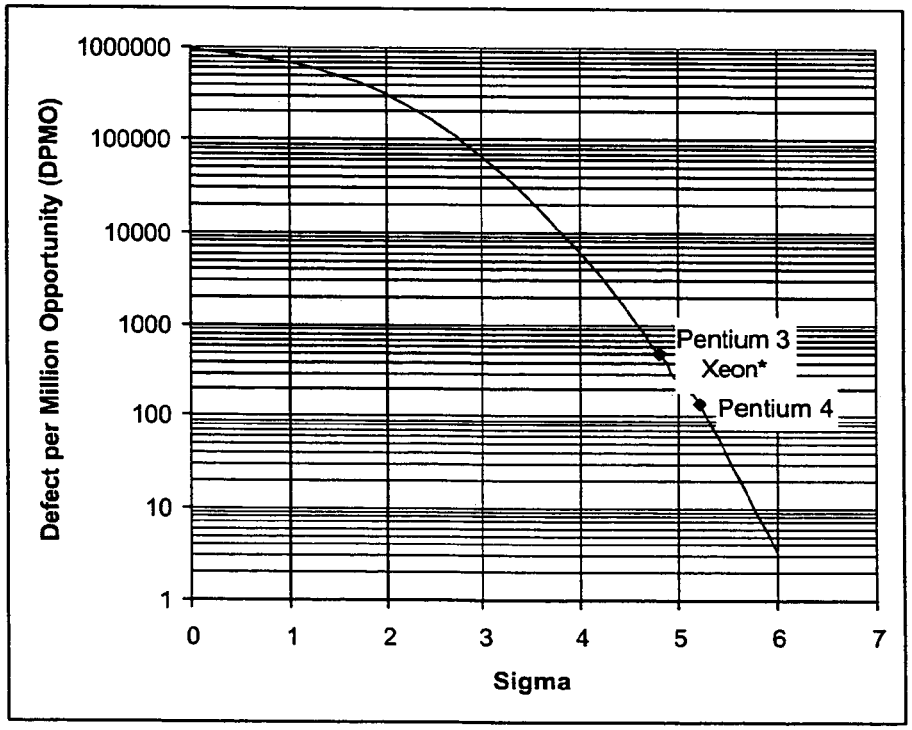
Intel Validation Process Improvement for Successive Pentium Projects
FIGURE 5

FIGURE 4        Pentium® 4 MPROV Model

| | | | | A Debug Cycle-Time (Months) | B Bug Exposure (Bugs) | C Design Size (KLOC) | D = Validation Throughput (KLOC/Month) $C \div A$ | E = Debug Rate (Bugs/Month) $B \div A$ | F = Bug Density (Bugs/KLOC) $(B \div C) \times 1000$ | G Relative Debug Effectiveness/ Efficiency (%) | H Design Quality/ Sigma (Defects/ MLOC) |
|---|---|---|---|---|---|---|---|---|---|---|---|
| MPROV MODEL PHASES | DR | | | | 1554 | 1000 | | | 1.6 | 20 / ? | |
| | DIV | | Block | | 100* | 1000 | | | | | |
| | | | Subsystem | 9 | 3411 | 1000 | | 379 | 3.4 | | |
| | | | System | 12 | 2398 | 1000 | | 200 | 2.4 | | |
| | | | Total | 21 | 5909 | 1000 | | 281 | 5.9 | 78 / 70 | |
| | | IV | | 18 | 392 | 1000 | | 21.8 | 0.4 | | |
| | HIT | | Block | | | | | | | | |
| | | | Subsystem | | | | | | | | |
| | | | System | 9 | 134 | 1000 | | 14.9 | | 2 / 30 | 134 / 5.17 |
| | | | Total | | | | | | | | |
| TOTAL | | | | 48 | 7989 | 1000 | 21 | 166 | 7.9 | 100 / 100 | |

*Exact level of model-checking is unknown.

IBM 3081 Design Error Projection vs. Actual

Results of IBM 3081 Formal Verification

FIGURE 8         IBM 3081 (LSI) MPROV Model

MPROV MODEL METRICS

| MPROV MODEL PHASES | | | Debug Cycle-Time (Months) | Bug Exposure (Bugs) | Design Size (KG) | Validation Throughput (KG / Month) | Debug Rate (Bugs / Month) | Bug Density (Bugs / KG) | Relative Debug Effectiveness / Efficiency (%) | Design Quality / Sigma (Defects / MG) |
|---|---|---|---|---|---|---|---|---|---|---|
| DIV | DR | Block | 16 | 500 | 800 | | | 0.625 | 15 / ? | |
| | | Subsystem | | 2640 | 800 | | 165 | 3.3 | 78 / 52 | |
| | | System | | | | | | | | |
| | | Total | | | | | | | | |
| | IV | | 20 | 860 | 800 | | 43 | 1.075 | | |
| HIT | | Block | | 50 | | | | | | |
| | | Subsystem | | 75 | | | | | | |
| | | System | 15 | 125 | 800 | | 17 | | 7 / 48 | |
| | | Total | | | | | | | | |
| TOTAL | | | 51 | 4250 | 800 | 16 | 83 | 5.0 | 100 / 100 | 313 / 4.94 |

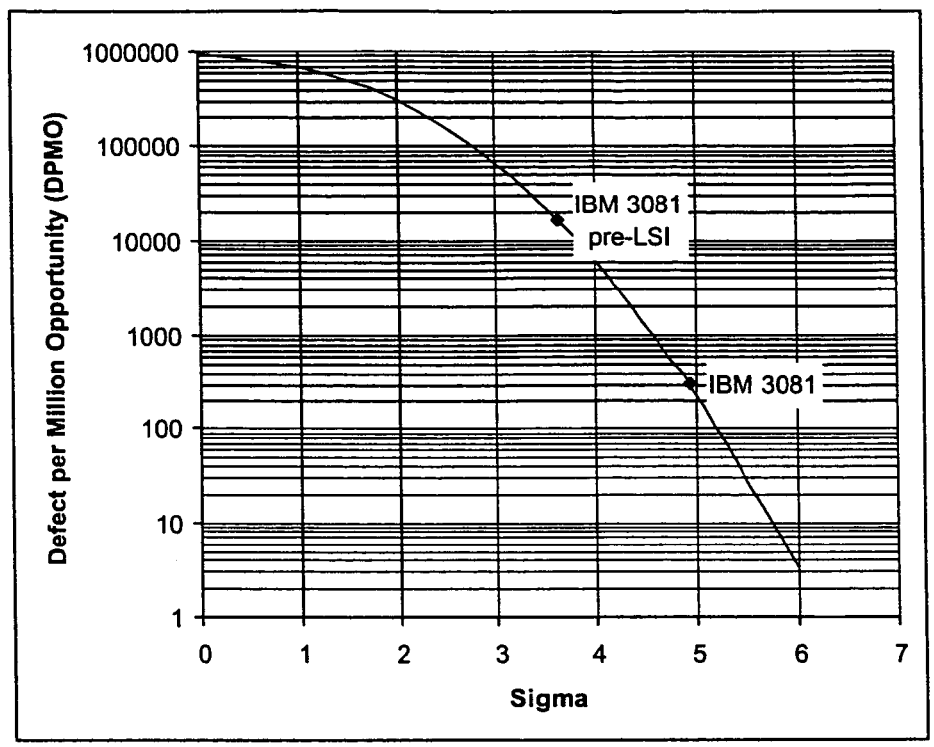
Figure 9. IBM Validation Process Improvements Transitioning to LSI
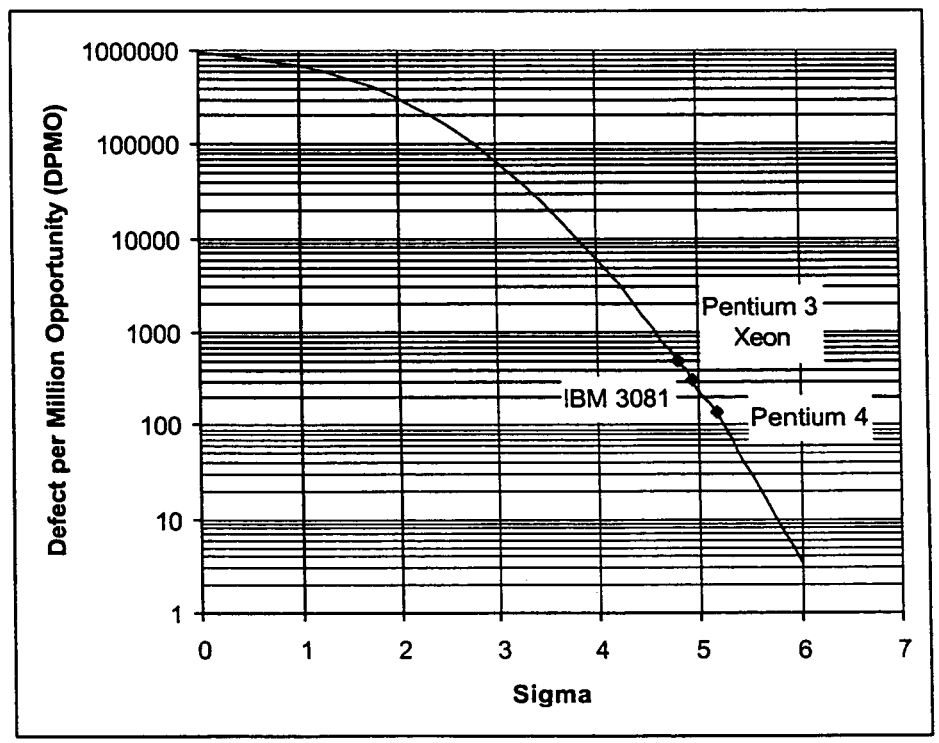
Figure 10. Sigma Comparison of IBM 3081 and Pentium® 3 & 4 Validation Processes

METHOD AND MANAGEMENT TOOL FOR ASSESSING AN ELECTRONIC DESIGN VALIDATION PROCESS

The present application claims benefit of priority from U.S. Provisional Patent Application No. 60/608,300 filed Sep. 7, 2004.

BACKGROUND OF THE INVENTION

The present invention relates to a method and business management tool for analyzing, comparing and assessing an electronic design validation process. More particularly, an embodiment of the present invention analyses, compares and assesses electronic design validation process associated with the validation of a design for an integrated circuit such as a microprocessor, ASICS, a chip or chip set.

Today's microprocessor design validation processes are largely simulation-centric, using model-checking to detect a relative few but very difficult corner-case design errors and relying on large simulation compute-farms, whose practicality and effectiveness have been made possible by advances in testbench languages and code coverage technologies, to detect the vast preponderance of specification and design errors. However, error detection is accomplished late in the validation cycle when the full-chip is verified.

Another electronic design validation process, an isomorphism-centric validation process, somewhat reverses the strategy of the simulation-centric validation process. Starting at the functional block level, an isomorphism-centric validation process uses isomorphism-checking, a very robust but indirect method of formal verification, to detect the vast preponderance of design errors made earlier and upstream in the design process. Then it focuses the power of simulation compute-farms on possible specification errors and the few remaining design errors. To date there is no relatively simple and effective technique to assess and compare these two, or any other, disparate electronic design validation process strategies. What is needed is a method and management tool that can be used to analyze, compare, contrast, and assess an electronic design validation process. Furthermore, what is needed is a method and management tool for effectively comparing a plurality of electronic design validation processes with each other.

BRIEF SUMMARY OF THE INVENTION

Assessing an Electronic Design Process (EDP) is not new to Electronic Design Administration (EDA). Indeed, the Electronic Design Processes Subcommittee (EDPS) was formed by the DATC in June 1991, and has held an annual workshop since 1993, which discusses electronic design and EDA process problems, plans and research. The design process of an integrated circuit is viewed as an integration of all design activities taking place throughout the entire design process, from product concept and marketing to manufacture, installation and use.

However, unlike the view and methodology of the EDPS, an exemplary embodiment of the invention focuses more sharply on a smaller, more manageable activity, namely the Electronic DesignValidation Process (EDVP). The verification process can take up to 70% of the IC design cycle and continues to be a growing industry concern. Embodiments of the invention are concerned with the validation process itself, rather than details regarding software tools and human resources.

An embodiment of the invention, a modeling of an EDVP, provides a means for providing comparative, quantitative assessments of the relative merits of both simulation-centric and isomorphism-centric validation strategies as used by, for example, Intel and IBM, respectively.

Another embodiment of the invention models a simulation-centric strategy, whose use is exemplified by the Pentium® 4 validation project. Here, the exemplary EDVP model provides a more complete and meaningful characterization of the impressive error-detection levels accompanying the record-breaking efficiency attained during Pentium® 4 post-silicon testing. Additionally, an exemplary model allows a quantification of the dramatic improvements made in design quality over two, or more, successive microprocessor generations.

Another embodiment of the invention models a isomorphism-centric strategy, which was developed by the IBM 3081 design team. Here, the exemplary EDVP model provides a means to quantify the impact that RTL-level formal verification had on earlier bug detection and bug-density reduction. The exemplary model provides a technique for illuminating the advantages associated with the transition from a pre-LSI prototype-hardware-centric process to an LSI isomorphism-centric validation process. Again, an exemplary model allows us to quantify the relative benefits resulting from this transition.

Embodiments of the EDVP model allow analysis, design-phase-to-design-phase comparisons that can provide a basis for determining which design verification methodology is best suited for an electronic design. Using existing data from previously designed microprocessors, an exemplary EDVP model provides evidence that, presently and despite the surprisingly equal effectiveness of simulation-centric and isomorphism-centric validation processes, an isomorphism-centric microprocessor validation process, which discovers most design errors upstream earlier when they first occur, is dramatically more efficient. Thus, in the present day, an isomorphism-centric microprocessor validation process, incorporating a robust Pentium® 4-equivalent compute-farm, as well as a more robust IBM 3081-equivalent formal verification technology, would make significantly shorter pre-silicon validation schedules and higher design quality distinct possibilities.

The above summary of the present invention is not intended to represent each embodiment or every aspect of the present invention

BRIEF DESCRIPTION OF THE DRAWINGS

A more complete understanding of the method and apparatus of the present invention may be obtained by reference to the following Detailed Description when taken in conjunction with the accompanying Drawings wherein:

FIG. 1 is a chart showing historic software design bug densities from 1976 to the year 2000.

FIG. 2 is a graph showing the Sigma learning curve.

FIG. 3 is a sigma learning curve graph for a Lockheed software development process.

FIG. 4 is an exemplary EDVP model and spreadsheet.

FIG. 5 is a Sigma graph having points providing improvement measurements, of an Intel validation process, derived by an embodiment of the invention.

FIG. 8 is an exemplary MPROV method and spreadsheet.

FIG. 9 is an exemplary method derived sigma data points for a couple of IBM design validation processes.

FIG. 10 is an exemplary method derived sigma data points comparing INTEL and IBM design verification processes.

DETAILED DESCRIPTION OF THE INVENTION

Figure 6:
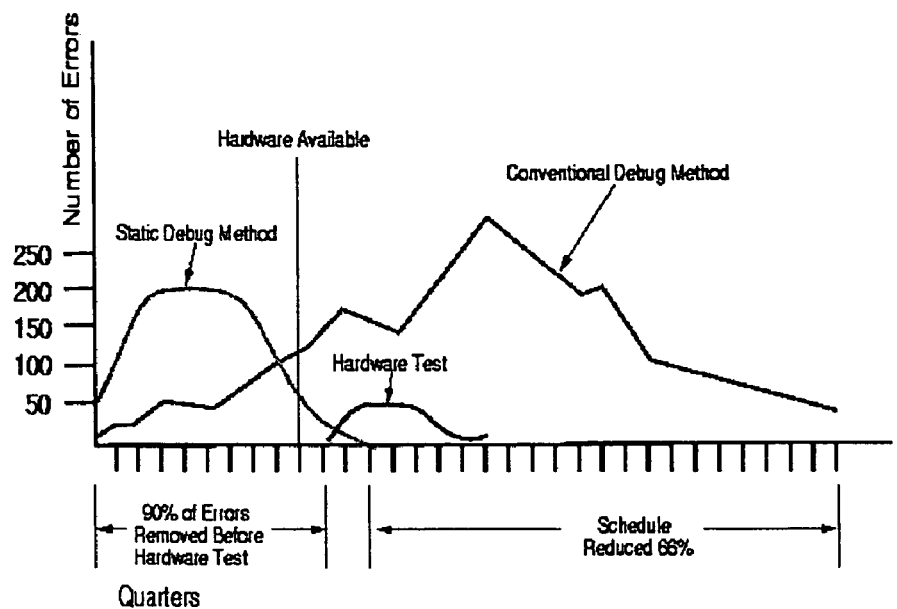
FIG. 6 is data for the IBM 3081 design verification process.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

First it is important to have an understanding of electronic design validation process modeling and some related terms. Here the term or expression "validation process" is used, rather than "verification process", throughout the remaining portions of this document. The definition of "validation process" is: determining whether or not a design is a "valid" elaboration of its specification. Here "valid" means, according to Webster's dictionary:

VALID, adj., 1: having legal efficacy or force; esp: executed with proper legal authority and formalities <~contract>.

Therefore, unlike formal verification, validation is a management-certifiable process, since it alone establishes the terms of the "contract".

Validation case studies of commercial microprocessors, are very rare. However, studies that concern modeling their validation processes are even rarer, and may be none existent. Since current HDL-driven hardware development has become more like software development—code inspections, coverage and bug density metrics, etc.—embodiments of the invention leverage some useful software engineering and development process concepts, along with successful business improvement concepts to build one of the exemplary validation process models, called MPROV, which we describe next.

MPROV is composed of four major components. The first dissects design validation process into four distinct phases called design review (DR), design integration verification (DIV), implementation verification (IV) and hardware integration test (HIT). Their relationship to the phases of the electronic design process is quite clear: DR and DIV focus on the detection of specification errors contained in a "paper" (i.e., original) specification, and the design errors introduced by designers. IV focuses on the implementation errors injected post-synthesis during physical design, and HIT on the detection of those errors that escaped the preceding three pre-silicon phases. Throughout the following, if specificity is not necessary, the term "bug" means any pre-silicon error. And, the word "defect" is used solely in reference to post-silicon errors.

The significant role of metrics in business is the point of the oft quoted comment of management guru Peter Drucker: "If you cannot measure it, you cannot manage it." The significant role played by metrics in software product development is well known. Exemplary metrics, used in embodiments of the invention, measure pertinent aspects of the validation process' phases and constitute the second component of MPROV, are defined in TABLE 1. Such metrics include, but are not limited to validation throughput, debug rate, bug density, design bug detection effectiveness, and design quality. There, two types are defined: phase metrics, which enable phase-by-phase comparison, and global metrics, which span multiple phases of a validation process and enable broader process-to-process comparisons.

TABLE 1

Definition of Metrics Used by MPROV

| METRIC NAME | DEFINITION |
|---|---|
| Validation Throughput | # correct gates per month |
| Debug Rate | # bugs removed per month |
| Bug Density | # bugs per Kgates (or KLOC) |
| Relative Debug Effectiveness | $\dfrac{\text{\# bugs removed}}{\text{\# total bugs} - \text{\# implememtation bugs}} \times 100\%$ |
| Relative Debug Efficiency | $\dfrac{\text{\# months}}{\text{Total months} - \text{\# implememtation months}} \times 100\%$ |
| Design Quality | # defects per Mgates (or MLOC) |
| Process Quality | Look up value of Sigma corresponding to a Design Quality in DFMO Table |

Use of the bug-density metric is illustrated in FIG. 1, which shows that improvements in this metric come slowly, about 3 percent per annum, and that a company with almost infinite resources was able to reach only 5 Faults/KLOC (faults per thousand Lines of Code) by 1995. It appears that "hardware" bug-density is consistent with software development experience.

MPROV's third component addresses a critical concern of validation process assessment, a standard measurement of performance. MPROV's standard measurement is the Sigma learning curve shown in FIG. 2. Note that use of this curve has enjoyed significant success and has become a standard that is accepted in the measurement of business processes improvement. Using the Sigma learning curve also aligns an exemplary analysis, comparison or assessment of an Electronic System Design Validation Process Improvement with Manufacturing Process improvement, where the business-critical gold-standard of performance excellence—3.4 defect-per-million (or Six-Sigma)—is used and illustrated graphically in FIG. 2. To date, the Sigma learning curve has never been used as a standard in accessing an electronic validation process. Note that, in particular, Six-Sigma's huge bottom-line benefits of being easily recognizable and usable by the industry though the industry had never thought of a technique or way of using the Sigma or "6-Sigma" curve as a standard to analyze an electronic design validation process.

FIG. 3 depicts the use of the Sigma learning curve together with Lockheed software development process results shown on TABLE 2. Here, it is shown, with respect to software development, the five Design Quality data level points and their corresponding improvements as the software development process matured. The graph also shows how the software development correlates with the Sigma learning curve. This software example also makes clear a fundamental limitation of assessment methods based solely on maturity levels—once the maximum level is achieved, motivation for further improvement may be diminished.

TABLE 2

Lockheed Software Development Results for a Typical 500 k-line Project

| SEI LEVEL | Development | | | Productivity | |
|---|---|---|---|---|---|
| | Cost ($M) | Time (Months) | Product Quality (Defects/KLOC) | (LOC/HR) | ($/LOC) |
| 1 | 33 | 40 | 9 | 1 | 66 |
| 2 | 15 | 32 | 3 | 3 | 30 |
| 3 | 7 | 25 | 1 | 5 | 14 |
| 4 | 3 | 19 | 0.3 | 8 | 6 |
| 5 | 1 | 16 | 0.1 | 12 | 2 |

Finally, note that the use of Six-Sigma in EDA is not new to software: IBM EDA Consulting Unit will bring Six-Sigma defect level to its application code. It is strongly noted that Six Sigma has not been used to assess or compare an electronic design validation process.

Simulation-Centric Validation Processes

To further understand an exemplary management tool for assessing, comparing and analyzing an electronic design validation process, it would make sense to understand an electronic design validation process like a simulation-centric validation process. The exemplary MPROV method and tool can be applied to the Pentium® 4 case study, whose results are shown in TABLE 3. The result data from TABLE 3 are used as input data in an exemplary EDVP model and spreadsheet shown in FIG. 4. From the last column of FIG. 3, one notes the data point, corresponding to the Design Quality value of 134 DPM, on the Sigma learning curve. Then, using the Pentium® 4's bug-exposure rate, and bug-exposure data from an earlier Intel microprocessor project, the exemplary inventions can be used to derive a second point on the Sigma learning curve (See FIG. 5). Based on the exemplary method's analysis of this, data shown below, we infer that the early Intel microprocessor mentioned was the Pentium® 3 Xeon (www.intel.com). Thus the exemplary MPROV method and tool allows us to quantify the record-breaking efficiency of Pentium® 4 post-silicon testing, as well as the significant improvement in design quality relative to Pentium® 3 Xeon.

TABLE 3

Summary of Pentium ® 4 Validation Process

| | Pentium ® 4[1] (Bugs/Months) | | | |
|---|---|---|---|---|
| Total Functional Bugs*/Validation Schedule | 7989 (7855 + 134)/48 | | | |
| Design Level | Functional Block | Subsystem (CTE) | System (Full-Chip) | |
| Design Size | ? | ? | >1 mil. SRTL LOG 1554 | |
| Design Review | | | | |
| Design Verification | 100 (Model Checking) | 3411/9 (Simulation) | 2398/12 (Simulation) | |
| Implementation Verification | 392/8 (Equivalence Checking) | | | |
| Hardware Test | ? | ? | 134[2]/9 | |

Now, the exemplary MPROV model and results shown in FIG. 4 make a number of conclusions readily apparent and useable. First, note that a constant Bug-Density, and Intel's well known substantially fixed 48-month development schedule along with Moore's Law, imply the Bug-Removal rates of successive microprocessor projects must quadruple. Second, an exemplary Pareto analysis of the Bug-Exposure results, which is shown in TABLE 4, shows that 20% of the total bug exposure was discovered during the pre-validation Design Review phase; in other words, at the earliest possible opportunity. Third, the value of Bug-Density is even lower than Baty's (see FIG. 1).

TABLE 4

Pareto Analysis of Intel Pentium ® 4

| | Relative Debug Effectiveness (%) | Schedule Impact (%) |
|---|---|---|
| DR | 20 | unknown |
| DIV | 78 | 44 (21/48) |
| HIT | 2 | 19 (9/48) |

Referring still to FIG. 4, the exemplary MPROV spread sheet tool is further described. Columns A, B, and C of the MPROV spread sheet indicate the debug cycle time in months, the bug exposure, and the design size in thousands of lines of code (KLOC) respectively. The numbers to fill columns A, B, and C are provided from the electronic design being verified. The validation throughput, measured in KLOC/month, in column D is calculated by dividing column C by column A. The bug density, measured in bugs/KLOC, in column F is calculated by dividing column B by column C and multiplying the quantity by 1000.

Two important results provided by an exemplary embodiment of the invention are the relative debug effectiveness and efficiency, measured in percent (%), of the design bverification process (column G). The effectiveness is calculated and equal to $(B \div (B_{Total} - B_{IV})) \times 100\%$. The efficiency of an electronic validation process is calculated and equal to $(A \div (A_{Total} - A_{IV})) \times 100\%$.

The design quality of column H is calculated and equal to $B \div C$. Furthermore, the exemplary sigma for a design verification process, measured in defects/MLOC, of column H is calculated and determined by looking it up on the sigma chart of FIG. 2 under defects per million. Method and tool for assessing a design verification processes prescribe a new standardizing technique for looking at design verification processes and comparing different design verification processes to each other.

Next, an exemplary method was used to qualify the relative improvement in design quality between the Pentium® 4 and an earlier Intel microprocessor, referred to as Microprocessor X, whose Bug-Exposure is given in TABLE 5. Now, the question is this: Which microprocessor is X?

TABLE 5

Intel Data on Microprocessor X[2]

| Bug Detection | Detection Phase |
|---|---|
| 2240 | # of detected bugs (pre-silicon) |
| 150 | # of escaped bugs (post-silicon) |
| 2390 | # of total bug exposure |

TABLE 6

Assumptions

| | | |
|---|---|---|
| Industry-Standard Assumptions | 1 | 25% of transistors = logic |
| | 2 | 10 transistors = 1 LOC (Kruetzer) |
| Gate-Count Assumption | | Pentium ® 3 Xeon = 9.5 million transistors |

TABLE 7

Pentium ® 3 Xeon RTL LOC Estimation

| | |
|---|---|
| Transistor Count | 9.5 million transistors |
| % of Logic | 2.5 million transistors |

$$\text{Total LOC} = \frac{2.5 \text{ million transistors}}{10 \text{ transistors per LOC}} = 250 \text{ KLOC} \approx 300 \text{ KLOC}$$

TABLE 8

Pentium ® 3 Xeon Design Quality Estimation

| | |
|---|---|
| Bug Exposure | = 300 KLOC × bug_density |
| | = 300 KLOC × 8 bugs/KLOC |
| | ≈ 2400 bugs |
| Defect Density | $= \frac{150}{300 \text{ KLOC}} = 0.5/\text{KLOC}$ |

Design Quality = 500 MLOC → σ = 4.81

To answer this question, the industry-standard assumptions (TABLE 6), the transistor-count of Pentium® 3 Xeon, and the Bug-Density of Pentium® 4 to determine the RTL code complexity of Pentium® 3 Xeon. This is described in TABLE 7. Then we use the Bug-Density of Pentium® 4 to estimate Pentium® 3 Xeon's Bug-Exposure, from which its Design Quality and Sigma value can be determined. This is shown in TABLE 8 and FIG. 5, respectively.

Now, the computation of microprocessor X's Bug-Exposure, which is indicated in TABLE 9, leads us to believe that it is the Pentium® 3 Xeon, since the result obtained matches the pre-silicon data shown in TABLE 5. Thus, as the Pentium® 3 Xeon morphed in the Pentium® 4, DPM decreased from 500 to 134 or 73%, and σ increased from 4.81 to 5.17 as analyzed and compared by an embodiment of the present invention.

TABLE 9

Summary of IBM 3081 Validation Process

| | IBM 3081 [3] (Bugs/Months) | | |
|---|---|---|---|
| Total Functional Bugs*/Validation Schedule | 4250/51 | | |
| Design Level | Functional Block | Subsystem (CTE) | System (Full-Chip) |
| Design Size | | | 800k gates |
| Design Review | | | |
| Design Verification | 2640/16 (Morph Checking) | | |
| Implementation Verification | 860/20 (Equivalence Checking) | | |
| Hardware Test | | | |

As the exemplary method and tool of the invention show via analysis, Intel may be the first in the semiconductor industry to achieve Six-Sigma design quality.

Isomorphism-Centric Validation Processes

Now looking at the isomorphism-centric validation processes. IBM has historically used isomorphism-centric electronic design validation processes to validate its mainframe processor designs. IBM first used LSI technology to lower costs and increase reliability, as its 3033 processor clearly demonstrated. However, its use in the 3081 processor, with increased performance and functionality, entailed enormous technical challenges in establishing its functional correctness, which resulted in a paradigm shift from the conventional hardware-centric, to an isomorphism-centric validation process, whose critical core capability was novel methods of formal verification. Today, one refers to those methods as isomorphism-checking and equivalence-checking, respectively. Thus, in this section, using the exemplary MPROV method and tool, we quantify not only the significant benefits accruing from this transition, which include not only dramatic improvements in bug-removal rates and validation schedules, but also an assessment of the relative improvement in the validation process itself.

Figure 7:
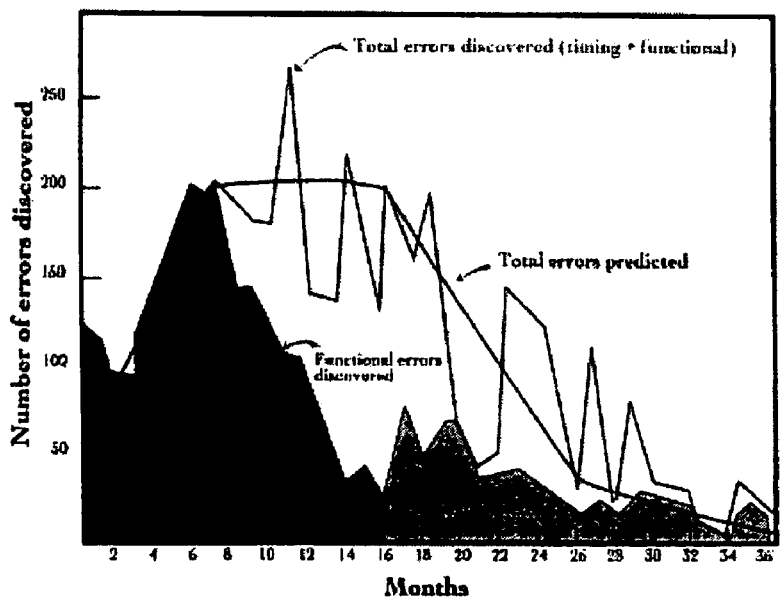
FIG. 7 is data for the IBM 3081 design verification process.

Now, the overall benefits of the isomorphism-centric process are shown in FIG. 6, whereas the more detailed benefits from formal verification are shown in FIG. 7. The MPROV input data in TABLE 9 were derived from the published data in FIGS. 6 and 7 by reverse engineering. The resulting MPROV model, which is shown in FIG. 8, makes a number of conclusions readily apparent. First, the Pareto analysis of the Bug-Exposure results, which are shown in TABLE 10, shows that 15% of the total bug exposure was discovered during pre-validation Design Review, the earliest possible opportunity. Second, the value of Bug-Density achieved is significantly lower than Baty's, and matches the best of NASA's long-term effort (see FIG. 1). But this was due to a clever methodology improvisation, a consequence of the 3081's use of a two-model paradigm, where an HDL reference model and an independent Schematic Design were concurrently verified, and its bug-count, . . . which is estimated to be about 4000 bugs . . . was not included in the total for the DIV phase, accounting for the apparent lower Bug-Density value. Therefore, when they are included, the 3081's effective Bug-Density is about 10 bugs/KG, which equals the reported pre-LSI value for Data Path logic (refer to the comment in FIG. 1). However, this nevertheless represented, as FIG. 1 also shows, dramatic improvement in control logic Bug-Density. Third, the Bug-Exposure obtained during HIT phase reflects the 3081's critical dependence on hardware-prototyping, which isomorphism-checking made more effective and efficient, since it had removed most bugs earlier upstream. Fourth, in view of the HIT total Design Quality provides the first point on the Sigma curve in FIG. 9.

TABLE 10

Pareto Analysis of IBM 3081

| | Relative Debug Effectiveness (%) | Schedule Impact (%) |
|---|---|---|
| DR | 15 | unknown |
| DIV | 78 | 31 (16/51) |
| HIT | 7 | 29 (15/51) |

TABLE 11

IBM 3081 Pre-LSI Design Size and Schedule

| Design Size | |
|---|---|
| Function Name | Gate Count |
| Control Logic | 300k |
| Data Path | 500k |
| Total | 800k |

| Projected Schedule [3] | |
|---|---|
| Debug Cycle Time | 96 months |

TABLE 12

IBM 3081 Pre-LSI HIT Bug Exposure

| | |
|---|---|
| Control Logic | = 500 KG × 20/KG = 10000 bugs |
| Data Path Logic | = 300 KG × 10/KG = 3000 bugs |
| Total | = 13000 bugs |

TABLE 13

IBM 3081 Pre-LSI Design Quality

| | |
|---|---|
| Design Quality | = DPMG |
| | = $\frac{13000 \text{ bugs}}{800 \text{ KG}} \times 1000$ KG = 16250 bugs |
| σ | = 3.625 |

Next, the exemplary method and tool is used to quantify the relative improvement in Design Quality between the 3081 and an assumed pre-LSI version, whose particulars [3] are given in TABLE 11. Thus, to estimate the pre-LSI 3081 processor Design Quality, one could use the pre-LSI Bug-Density in FIG. 1, along with the gate-count in TABLE 11 to estimate its Bug-Exposure. This is shown in TABLE 12. Then the pre-LSI version of 3081 is easily to be shown in TABLE 13. Also shown is the corresponding value of σ, derived using an embodiment of the present invention, which provides the second data point on the Sigma curve in FIG. 9, and which makes the improvement in the validation clear and strikingly more vivid. Thus, in transitioning to LSI, an embodiment of the present invention makes it easy to visualize and understand that the DPM decreased dramatically from 16250 to 500, or 97%, and that the Global Debug Cycle Time decreased an equally significant 66%. Finally, an observation that "We are still not getting what we need in terms of quality design in a predicable time frame" is shown to be untrue at IBM.

Embodiments of the present invention can be utilized by management and manufacturing entities in a company to compare and analyze different electronic design validation processes. Above it has been shown how an exemplary embodiment of the invention can provide design phase-by-phase comparisons of the Pentium® 4 and IBM 3081 validation processes.

The exemplary comparisons are based on an exemplary MPROV model data in FIGS. 4 and 8. Referring to these exemplary FIGURES, one can see that:

Comparing Relative Debug Effectiveness during the DR phase shows that the +5% differential of the Pentium® 4 translates into a 3× in Bug-Exposure. Hence, in the number of bugs discovered at the earliest possible moment. However, note that the two-independent models allowed the isomorphism-centric strategy to leverage the productivity differential between HDL-based design and schematic capture, and thus detect about 4000 bugs prior to validation, in addition to the 500 bugs discovered during the DR phase. (Recall that a Bug Density of about 10 and 800 KG imply a bug exposure of 8000, rather than the reported 4250.)

Comparing the RDE during the DIV/BLOCK phase shows that, using isomorphism-centric-based formal verification, isomorphism-centric validation captures 78% of the non-implementation bugs, which means 96% of those that escape the DR phase. Note that at this point simulation-centric informal verification (i.e., simulation) has not yet kicked in. However, most surprisingly, both validation strategies are, as their identical total RDE values prove, equally effective.

Comparing total Debug Rates (281 vs. 165) suggests that a simulation-centric strategy is more efficient. However, the fact that eight Pentium® 4 microprocessors were simulated and debugged concurrently implies that its effective Debug Rate is about 34. Thus, relative to a microprocessor team, an isomorphism-centric strategy is about 3 times more efficient. This is consistent with debugging experience that uses counter-examples produced by formal equivalence checking.

Finally, comparing Design Quality during the HIT phase (134 vs. 313) shows the dramatic impact that concurrent simulation had on discovering more bugs earlier. This is most vividly illustrated in FIG. 10. However, note that Intel did not pass the IBM 3081 Design Quality until the release of Pentium® 4 microprocessor. Thus, it is now clear that the exemplary MPROV method and spreadsheet is a tool that provides an easy technique for analyzing, comparing, and assessing an electronic design validation process.

Using the exemplary MPROV method one can come to the following conclusions regarding simulation-centric versus isomorphism-centric validation processes. Based on the results generated by MPROV one may believe that an isomorphism-centric process obtained by replacing model-checking with isomorphism-checking in the Pentium 4 validation process would capture most non-implementation bugs earlier during the DIV/Block phase, as well those that escape through. This means a lower DPM, a shorter HIT schedule, and ultimately a faster time-to-market. To make this evident, one could argue as follows: First, recall that the RD EFFECTIVENESS metric of both processes are the same (78%) for the DIV phase, whereas, the RD EFFICIENCY metric of the 3081 (52%) is significantly lower than that of the Pentium 4 (70%). Thus the modified process using isomorphism-checking would capture all 5909 DIV bugs during the DIV/Block phase in 16 months (i.e., 30×52%), not in 21 months as was the case, which is a 24% reduction in Debug Cycle-Time. Next, since simulation is, as noted above, is 96% effective, 129 of the 134 that escape formal verification would be capture during the DIV/Subsystem and System phases. Hence, the DPM is reduced from 134 to 5, which means a shorter HIT schedule, a process performance nearer to Six-Sigma, and a faster time-to-market as well.

REFERENCES

1. Bob Bentley, "Validating the Intel® Pentium® 4 Microprocessor", in the Proceedings of the 38th Design Automation Conference, paper 16.1, June 2001.
2. DAC-2004 Panel "Verification: What Works and What Doesn't", the 41st Design Automation Conference, ACM/IEEE. June, 2004. Also the Summary in EE Times, Jun. 25, 2004.
3. Michael Monachino, "Design Verification System for Large-Scale LSI Designs", IBM Journal of Research and Development, pages 89-99, Vol. 26, No. 1, January 1982.
4. Nancy R. Mann, "The Key to Excellence—The Story of the Deming Philosophy", 3rd Edition, ©1989, Prestwick Books, Log Angeles.
5. Alfred M. Pietrasanta, "A Strategy for Software Process Improvement", the 9th Annual Pacific Northwest Software Quality Conference, Portland, Oreg., Oct. 7-8, 1991.
6. Joel Mokyr, "The Gifts of Athena—Historical Origins of the Knowledge Economy", ©2002, Princeton University Press. ISBN 0-691-09483-7.

7. Jack Welch and John A. Byrne, "Straight from the Gut", ©2001, Warner Books, Inc. ISBN 0-446-52838-2.
8. Robert P. Kurshan, "Computer-Aided Verification of Coordinating Processes—The Automata-Theoretic Approach", ©1994, Princeton University Press. ISBN 0-691-03436-2.
9. Richard Goering, "Productivity May Stumble at 100 nm—Design and Verifying Silicon Calls for a Fundamental Shift in Thinking", Future of Semiconductors Section, EE Times, October 2003.
10. Harry D. Foster, Adam C. Krolnik and David J. Lacey, "Assertion-Based Design", ©2003, Kluwer Academic Publishers. ISBN 1-4020-7498-0.
11. Charles W. Rosenthal, "A Structured Method for Assessing the Maturity of an Electronic Design Process", in the Proceedings of the International Conference on Management of Engineering and Technology, Oct. 27-31, 1991, pages 242-246.
12. Anonymous, an ancient Sanskrit saying.
13. Electronic News, Mar. 18, 1991.
14. K. H. Möller and D. J. Paulish, "Software Metrics—A practitioner's Guide to Improved Product Development", ©1993, IEEE Computer Society Press. ISBN 0-412-45900-0.
15. Bob Colwell, "Design Reviews", Computer, pages 8-13, V. 36, No. 10, October 2003, IEEE.
16. Ted Lewis, "The Big Software Chill", Computer, pages 12-14, V. 29, No. 3, March 1996, IEEE.
17. Merriam-Webster College Dictionary, $10^{th}$ Edition, 1995.
18. Richard Goering, "Verification Breakthroughs Light Up Show", DAC Preview Section, EE Times, Jun. 8, 1998.

The invention claimed is:

1. A method for validation of a logical circuit design, comprising the steps of:
   a) presenting a design for a logical circuit;
   b) establishing a statistically anticipated incidence of errors in the design of the logical circuit;
   c) first employing an isomorphism validation process to detect deviation of the design of the logical circuit from a logical equivalent; and
   d) second employing a simulation validation process to detect functional errors in the design of the logical circuit, until a sufficient number of errors are identified to meet an acceptable quality threshold, the threshold being established based on the statistically anticipated incidence of errors, and said second employing step occurring directly after said first employing step.

* * * * *